US011741922B2

(12) United States Patent
Rein et al.

(10) Patent No.: US 11,741,922 B2
(45) Date of Patent: Aug. 29, 2023

(54) METHOD AND SYSTEM FOR TEMPLATE BASED VARIANT GENERATION OF HYBRID AI GENERATED SONG

(71) Applicant: BELLEVUE INVESTMENTS GMBH & CO. KGAA, Berlin (DE)

(72) Inventors: Dieter Rein, Berlin (DE); Jurgen Jaron, Berlin (DE)

(73) Assignee: BELLEVUE INVESTMENTS GMBH & CO. KGAA

(*) Notice: Subject to any disclaimer, the term of this patent is extended or adjusted under 35 U.S.C. 154(b) by 262 days.

(21) Appl. No.: 17/134,708

(22) Filed: Dec. 28, 2020

(65) Prior Publication Data

US 2021/0118416 A1    Apr. 22, 2021

Related U.S. Application Data

(63) Continuation-in-part of application No. 16/571,395, filed on Sep. 16, 2019.

(60) Provisional application No. 62/731,193, filed on Sep. 14, 2018.

(51) Int. Cl.
*G10H 1/00* (2006.01)
*G06N 20/00* (2019.01)

(52) U.S. Cl.
CPC .......... *G10H 1/0025* (2013.01); *G06N 20/00* (2019.01); *G10H 2210/121* (2013.01)

(58) Field of Classification Search
CPC . G10H 1/0025; G10H 2210/121; G06N 20/00
See application file for complete search history.

(56) References Cited

U.S. PATENT DOCUMENTS

2012/0312145 A1\* 12/2012 Kellett ............... G10H 1/38
84/613

FOREIGN PATENT DOCUMENTS

KR    20150112048 A  \* 10/2015
KR      101896193 B1 \* 9/2018

OTHER PUBLICATIONS

Li et al., A Comprehensive Survey on Deep Music Generation: Multi-level Representations, Algorithms, Evaluations, and Future Directions, arXiv preprint arXiv:2011.06801, Nov. 13, 2020 (Year: 2020).\*

\* cited by examiner

*Primary Examiner* — Jianchun Qin
(74) *Attorney, Agent, or Firm* — Fellers, Snider, Blankenship, Bailey & Tippens, P.C.; Terry L. Watt

(57) ABSTRACT

According to an embodiment, there is provided a system and method for automatic AI-based song construction based on ideas of a user. In some embodiments, an embodiment is provided with a database that contains harmony templates which can be used by the user to augment the playback of a given music work. Various embodiments of the instant invention also benefit from a combination of expert knowledge resident in an expert engine which contains rules for musically correct song generation and machine learning in an AI-based audio loop selection engine for the selection of compatible audio loops from a database of audio loops.

7 Claims, 5 Drawing Sheets

METHOD AND SYSTEM FOR TEMPLATE BASED VARIANT GENERATION OF HYBRID AI GENERATED SONG

CROSS REFERENCE TO RELATED APPLICATIONS

This application is a continuation-in-part of co-pending U.S. patent application Ser. No. 16/571,395, filed Sep. 16, 2019, which application claims the benefit of U.S. Provisional Patent Application Ser. No. 62/731,193 filed on Sep. 14, 2018, and incorporates said applications by reference into this document as if fully set out at this point.

TECHNICAL FIELD

This disclosure relates generally to methods of editing and generating audio content and, in more particular, to methods utilizing a combination of collected and stored expert knowledge and machine learning in an artificial intelligence-based ("AI") selection engine for automatic audio song construction.

BACKGROUND

Creation of a musical work has been a goal and dream of many people for as long as music has been around. However, a lack of knowledge of details regarding the intricacies of musical styles has prevented many from writing or generating music. As such, this endeavor has, for a very long time, been the purview of individuals having the necessary knowledge and education.

With the advent of the personal computer and other computerized devices (e.g., tablet computers) and the widespread adoption of these devices in the home consumer market, software products emerged that allowed a user to create original music without the need-to-know music theory or needing to understand the terminology of music constructs such as measures, bars, harmonies, time signatures, key signatures, etc. These software products feature graphical user interfaces that provide users with a visual approach to song and music content creation that allowed the novice user easy access to the tools useful in music generation and enabled the users to focus on the creative process without being hampered by having to learn the intricacies of music generation.

In addition to increasing the accessibility of music generation, the content that is available and usable in the process of generating music has also been adapted to correspond to the directive of supplying an easy-to-use music generation approach. These sorts of programs typically provide a number of individual sound clips of compatible length, e.g., sound loops or just "loops", which can be selected and inserted into the multiple tracks of an on-screen graphical user interface as part of the process of music creation. With these sorts of software products, the task of music or song generation has come within reach of an expanded audience of users, who happily take advantage of the more simplified approach to music or song generation as compared with note-by-note composition. These software products have evolved over the years, gotten more sophisticated and more specialized and some have even been implemented on mobile devices.

The general approach to music or song generation provided by these software products has remained virtually unchanged, even though the processing power of the computing devices has increased and the types of devices that run this software has expanded on par with the changes in device distribution. That is, the conventional approach to music creation which has remained largely unchanged involves requiring the user to select individual pre-generated audio loops that represent different instruments (e.g., drums, bass, guitar, synthesizer, vocals, etc.), and arrange these loops in digital tracks to generate individual song parts, typically with a length of 4 or 8 measures, the goal being the generation of a full audio clip or song. Using this approach most users are able to generate one or two of these song parts with the help of the graphical user interface of a mobile or desktop-based software product according to their own taste and are therefore potentially able to generate individual verses and maybe the refrain of their own song.

A complete song or a complete musical composition however is normally, for example, at least two minutes long and includes more than only one song part, e.g., up to 16 individual song parts might be used to generate a sonically pleasing composition. To generate so many song parts with the necessary enthusiasm and eye for detail exceeds the patience and endurance of most users and these users often end the creation process in frustration without completing a musical work, obtaining one that is of insufficient length, or obtaining a work that is not musically satisfying. In addition to these problems on the creative and user interface side of the creation process, repeated discontinuation of the creation process of a song or music piece may result in permanent abandonment of the software product itself which is also not desirable either for the user or the provider of the software since completion of the project provides the user with positive feedback in the form of pride in having completed the project which potentially also results in a favorable impression of the software tool used to do that. Additionally, given the prevalence of social media, production of a musically appealing composition can result in approval from a valued online community when the work is posted which, in turn, encourages the undertaking of additional music creation projects.

Thus, what is needed is a system and method that allows a user to complete the song or music generation process and produce a result that is a musically pleasing complete song or music piece. What is also needed is a system and method that provides the user with expert guidance in creating the work, where the guidance is based on collected and evolving expert knowledge and machine learning in an AI-based system for selection and positioning of suitable audio loops consistent with a user's end goal.

Heretofore, as is well known in the media editing industry, there has been a need for an invention to address and solve the above-described problems. Accordingly, it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with accompanying drawings, should not be construed as limiting the invention to the examples (or embodiment) shown and described. This is so because those skilled in the art to which the invention pertains will be able to devise other forms of this invention within the ambit of the appended claims.

SUMMARY OF THE INVENTION

According to an embodiment, there is provided a system and method for hybrid AI-based song or music piece construction. In one embodiment the algorithm is integrated into a music generation/song construction process and comprises a combination of expert knowledge in an expert engine and the utilization of machine learning processes in an AI-based loop selection and provision engine. The expert engine provides information and support for the user to make sure that the song construction process is musically correct regarding a preferred song structure, wherein the AI engine is directed to suggest and provide proper and fitting audio loops consistent with the user's musical goal.

It should be clear that an approach such as this would be a tremendous aid to the user and would additionally provide assistance in the development and the creation of professional music pieces/songs, wherein the formerly tedious and often frustrating process of manually generating song parts and filling these song parts with fitting audio loops is simplified and amplified by expert knowledge and machine learning based information. Therefore, this approach delivers functionality to the user of music creation programs which enables a user to continue and complete the music generation process satisfactory or even automate the music generation process completely. Additionally, due to the fact that the provision and selection of available and potentially usable audio loops is based on machine learning information that is selecting content independent from style based limitations, the user is potentially provided with options regarding the audio loop selection that he or she might never have imagined, therewith a music piece/song could potentially benefit extraordinarily from such a style limitation breaking suggestion of audio loops.

The foregoing has outlined in broad terms some of the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments.

BRIEF DESCRIPTION OF THE DRAWINGS

These and further aspects of the invention are described in detail in the following examples and accompanying drawings.

DETAILED DESCRIPTION

Figure 1:
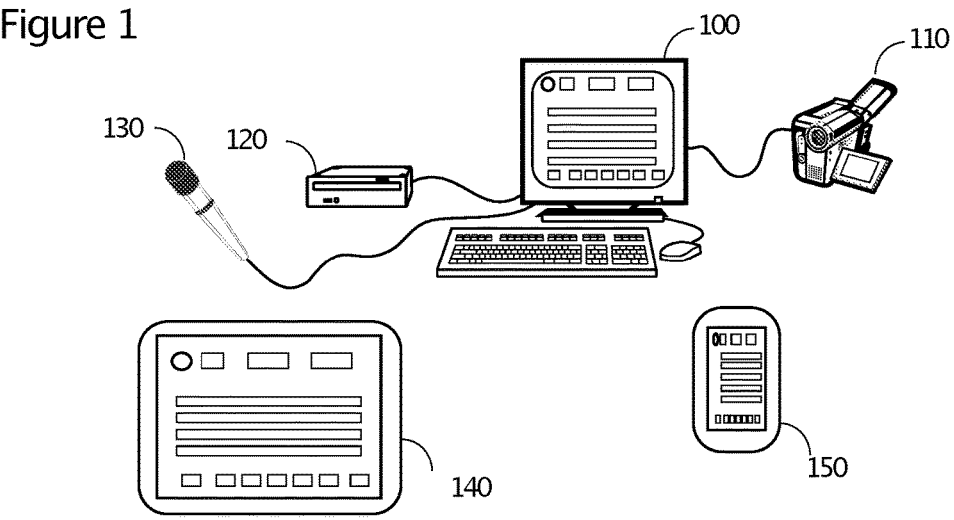
FIG. 1 is an illustration of a working environment of the instant invention according to an embodiment.

While this invention is susceptible of embodiments in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

As is generally indicated in FIG. 1, at least a portion of the instant invention will be implemented in form of software running on a user's computer 100 or other device with a CPU such as a table computer, smart phone, etc. For purposes of the instant disclosure, the word "computer" or CPU will be used generically to refer to any programmable device such as those listed in the previous sentence. Such a computer will have some amount of program memory and storage (whether internal or accessible via a network) as is conventionally utilized by such units. Additionally, it is possible that an external camera 110 of some sort be utilized with—and will be preferably be connectible to—the computer so that video and/or graphic information can be transferred to and from the computer (FIG. 1). Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g., in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing between it and the computer is utilized. Additionally, a microphone 130 might be utilized so that the user can add voice-over narration to a multimedia work and a CD or DVD burner 120 could be useful for storing in-progress or completed works. Further, it might also be possible and is shown in FIG. 1 that the process of the instant invention might be implemented on portable tablet computer devices 140 or on mobile devices, such as smart phones 150.

Figure 2:
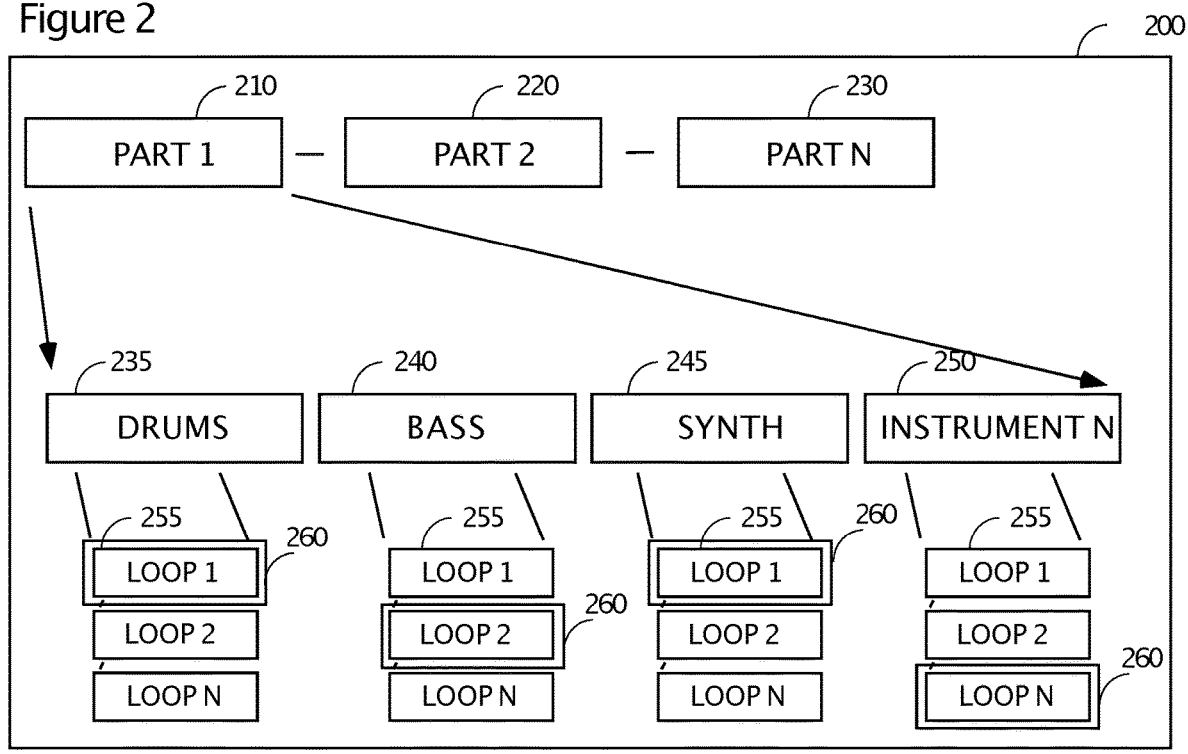
FIG. 2 depicts a general and basic structure of a song or portion of a song according to an embodiment of the instant invention.

Turning next to FIG. 2, this figure illustrates the skeletal structure of a song or a music piece 200 according to an embodiment. This structure functions as the starting point for the functionality of the instant invention. A song or music piece generated by an embodiment of the software product will consist of a plurality of individual song parts which is illustrated by part 1 210 and part 2 220 in FIG. 2, where the denomination of part N 230 is used to show that a potential song or music piece might consist of an arbitrary number of parts. Each part has a specific runtime at a given tempo, which might be selected and defined by the user, alternatively the run time might be strictly defined as being, for example, 4 or 8 measures or multiples thereof. Additionally, these parts might be further specified by, for example, designating them as being an intro or an ending. FIG. 2 also generally indicates that each part of a song or music piece preferably consists of an arbitrary number of instruments, wherein audio loops that sound these instruments are supplied accessible to the user and the AI engine discussed below, an audio loop being a digital section of sound material that usually may be seamlessly repeated, i.e., "looped". Further details with respect to the figure are presented below.

In FIG. 2 the instruments drums 235, bass 240 and synth 245 are depicted, which is not meant to limit the specification of the instant invention to only these instrument variations, on the contrary it should be clear that a plurality of other instrument choices are certainly possible, and the limitation to these three instruments in this figure is only for illustrative purposes. Also instrument N 250 is depicted as being chosen to illustrate this fact, where N stands for an arbitrary number of instruments. For each of the available and potentially selected instruments at least one audio loop 255 at a time is selectable 260 and therewith being replayed during the play time of the particular part. The selection of each audio loop is either carried out by the user manually or automatically by the instant invention.

Figure 3:
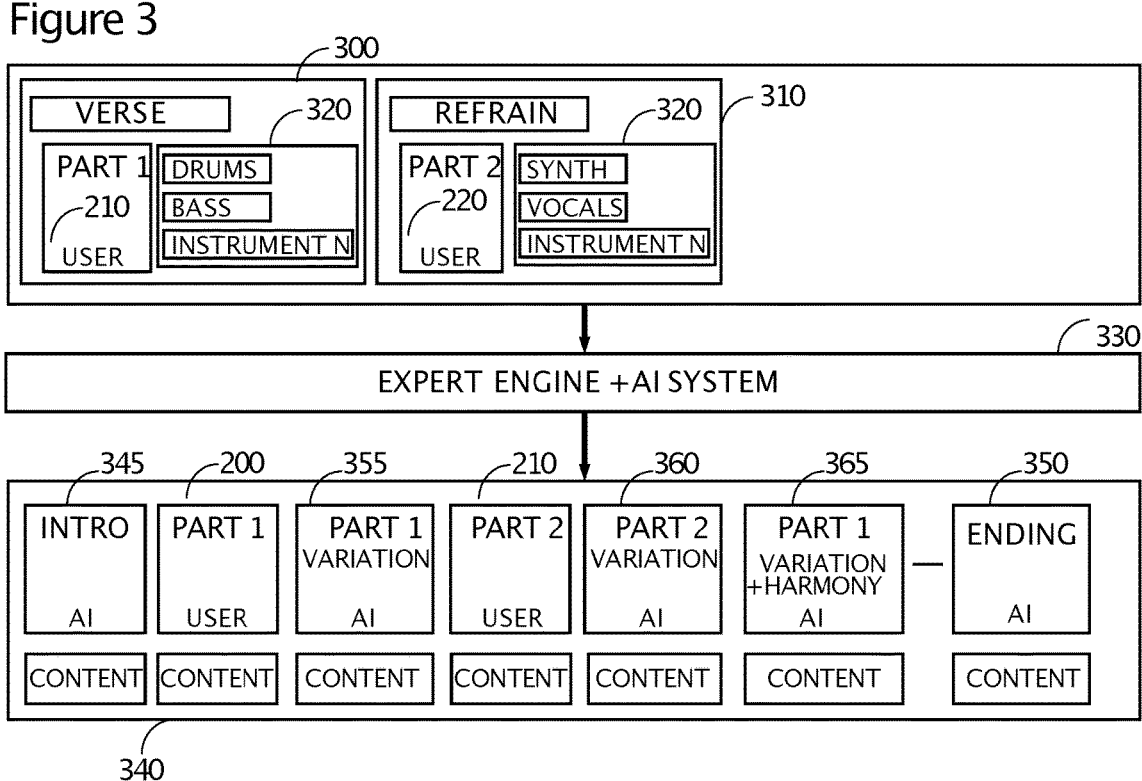
FIG. 3 illustrates a high-level view of the interaction of the parts of an embodiment.

FIG. 3 gives additional details of the process of constructing a skeleton. The structure or skeleton of a song is depicted there. In this example, a song is constructed of 8 individual sections, which might be an intro 345, an ending 350, all of the user supplied sections with their content 200 and 210, and, in this particular example, a mixture of variations of these supplied parts (355, 360 and 365). In addition, parts might be added to the skeleton to lengthen the runtime of the work. So, in this example the skeleton basically includes an intro and an ending and in between the user parts plus variations of these parts and new parts, the variations and new parts preferably being chosen and defined and automatically added by the expert engine. Of course, other song parts might be available including, for example, a song bridge, a song refrain/chorus, pre-chorus, etc.

The AI system uses the skeleton model as a starting point and the skeleton model has the song structure planned, i.e., the parts, style, instruments and so on. To fill in the gaps in the skeleton model the AI system analyzes each empty part and its desired content (as specified by the skeleton) and fills it with loops consistent with the requirements of those parts. The AI system has access to all of the loops and information about all the loops in the loops database and their associated auditory properties. The AI system may or may not select a loop from a style that is normally used to, for example, to generate a blues song if "Blues" is the selected style. But, if the AI system determines that the auditory properties of a different loop in the database are sonically compatible or even better suited then it may select that loop for insertion into the skeleton, independent from the style association of that loop.

In one preferred embodiment the selected audio loop is played during the whole runtime of the part to which its parent instrument belongs, however it is also possible that the user may select and de-select or switch individual audio loops during the runtime of the particular part. The instant invention provides and utilizes an evolving and growing database of audio loops, wherein the audio loops are categorized according to one or more particular styles, for example EDM, 50s, Drum'n Bass and House. Each individual style features a plurality of different instruments associated with it and each instrument has a specific number of associated audio loops, i.e., audio loops in which the instrument sounds when the loop is played (e.g., recorded). Of course, there might be one or multiple instruments recorded in a loop. Also, in some cases, the loop might not contain traditional audio recordings of an acoustic instrument but might contain computer generated sounds that resemble (or not) traditional instruments. Either way, when it is said that an instrument is recorded in a loop that term should be broadly construed to cover instances where there is a digital audio recording of that instrument as well as cases where the audio material in the loop is computer generated. This database will preferably be updated on a regular basis with new styles and the associated instruments and loops being added, existing styles with the associated instruments and loops being updated or deleted, etc. Preferably these updates will be delivered over the Internet for free or in exchange for a particular payment option.

Talking further about FIG. 3, this figure illustrates the interaction of the participating parts of an embodiment of the instant invention in a compressed form. Preferably in most cases, the instant invention will begin with a fragmented song or music piece, comprised of at least one, and preferably two, selected and defined song parts, usually a verse 300 and a chorus or refrain 310 of a music piece. These song parts are generated and provided with audio content 320 by a user, the content preferably being audio loops selected by the user. This song fragment might be the starting point for the instant invention; alternatively, the starting point might be the selection of a music style, or a seed song from a song library. For each of the different starting points the following steps are the same in this embodiment—the starting data (e.g., loops/variation/style/volume or intensity or dynamic, etc.) is selected by the user and provided to the combination of the expert engine and the AI system 330. This combination will preferably proceed to sequentially process the existing user-defined starting point and as a result provides a complete song 340 for review by the user. Additionally, the user might influence the song creation process by specifying a desired tempo or preferences regarding the dynamic progression of a song (for example—the beginning should be calm—in the middle it is aggressive and at the end energetic).

By way of additional details, in certain embodiments an expert engine will analyze the user defined or selected song parts to identify a preferred style. Based on the style a song length will be chosen by the expert engine that is predominantly associated with that style. That is, the expert engine will contain rules, guidelines, preferences, etc., provided by experts who are familiar with a particular style of musical works, collectively "rules" hereinafter. That being said, it should be understood that these guidelines might (or might not) be strict rules, but instead are more general preferences. The rules that are accessible by the expert engine might include things such as the length of the song, preferential chord change patterns, preferable instruments, preferable tempos, preferable percussion patterns, etc. Thus, the user may, for example, override the suggested song length and choose an alternative length if that is desired. Given the identified or selected style, the following sorts of decisions can be made by the expert engine as part of the music work creation process:

the song skeleton will be generated;
instruments/voices/loops will be selected;
a harmonic progression can be selected;
the dynamics dramaturgy of the musical work can be determined for the musical that is to be created;
the range of variation that is permitted in the selected loops for that style can be established, e.g., how many loops can be changed and how different from the loops already in use a newly selected loop can be, etc. (i.e., a "variance setting" hereinafter, described in greater detail below below).

To better understand the capabilities of the expert system, it may be useful to understand how an embodiment is constructed. The expert system is a conglomerate of information gathered from music experts who were asked to provide information about how a particular song in a selected style should be built within the confines of a loop-based music generation system. So, the expert system is a curated system that is constantly updated and therefore living i.e., constantly updated system which is incremented by new additions or changes to the contents of the expert system.

With respect to the AI system, this system has access to a loops database, wherein each loop is associated with one or more different compatible music styles or genres (e.g., African, Arabic, Asian, blues, country, electric, folk, hip hop, jazz, Latin, pop, R&B/soul, rock, classical, etc.). The AI is trained with all the loops independent of the style association, meaning that the AI system has access to all the parameters of the loops, their auditory properties (calm/aggressive, singer, no singer, female singer etc.), their lengths, tempos, dynamics and key and the associated instrument and style.

The AI system uses the skeleton model as a starting point and the skeleton model has the song structure planned, i.e., parts, style, instruments and so on. To fill in the gaps of the skeleton model the AI system analyzes each part and its desired content and fills it, even if the style of the loop is different from the requested style. So, the AI system is not limited to use the designated style in selecting loops—there are no style boundaries with the AI system in terms of loop selection. Even though the skeleton model is requesting specific audio loops of styles, the AI system potentially utilizes other information to select loops that might not be associated with the requested style, it might even be associated with a style that is not musically combined or used with the requested song style. For example, if the requested designated style is "blues" and the AI system identifies a loop from a different style that is compatible and well suited for the requested part of the skeleton model, that loop might still be selected and inserted into the skeleton model.

The loop selection process is based on the auditory properties and requirements and particular characteristics of the song skeleton and the instrument type. So, for example, a loop might be stored in the database with a number of performance-related parameters values such as its length (in beats, measures, run time, etc.), a preferred tempo, its timbre, a measure of its harmonic compatibility (e.g., is it in major or minor key, are there particular styles that it is incompatible with, can it be transposed without loss of quality to the current key, etc.), rhythmic information (e.g., is it syncopated, straight time, —properties of music). These values are stored for each loop in the database and the AI utilizes some or all of these performance parameters when being trained and ultimately when selecting new loops. When an embodiment of the AI system is requested to fill in a song skeleton, it will first look at the user-provided audio loops (provided by the user in the parts, e.g., parts 200 and 210). It will also determine with which instruments each loop is associated, i.e., which instruments each loop expresses. The AI will analyze the performance parameters of the initial existing loops and select loops for insertion for which the values (in view of all performance parameters) are within a defined threshold and belong to a particular instrument. It may be clear now that the type and preferences of the song skeleton does not necessarily control the loop selection process to any great extent. The loop definition and selection process are primarily based on the user-chosen audio loops and their associated data values—meaning, the type of instruments associated with the audio loops and therewith skeleton model also contributes to the loop selection process.

The completed song preferably consists of an intro section 345 and ending section 350, any pre-existing user generated song parts 210, 220 and a plurality of additional song parts that have been generated according to structural requirements defined by the expert engine and filled with appropriate content provided and proposed by the AI system, so, for example, the AI system may select different audio loops for the vocal instrument selected in original part 2 220 and the expert engine may determine it structurally inconsistent to have different audio loops in the vocals instrument and may delete the vocal instrument completely, thereby generating a variation 360 of original part 2.

Instead of changing or deleting specific audio loops from the different parts and instruments other options are also available for the generation of variations of the selected parts, for example the expert system may change the harmony of the part, the bpm (beats per minute) of the song part, create a harmonic progression for the selected part, change the intensity of effects over the running time of the selected part—all these options resulting in a variation of an original part. The instant invention additionally provides a global setting for the variance whose spectrum might be definable by the user and which ensures that for each iteration of the instant invention different but still fitting audio loops are selected and inserted. With this variance setting the system will preferably be able to generate many different variants of a song or music piece in a very short amount of time, wherein all these variants are based on the initial song ideas from the user. Additionally, to the global setting for the variance it might also be possible that the variance setting might be applied to individual song parts only.

As an example, suppose song No. 1 has part 1 with three instruments and in each instrument one loop, with part 1 having been constructed by the user. The AI system knows the auditory properties of these three loops and if the variance level is low the AI system in its selection of new loops for part 2 in the skeleton model only selects audio loops for the instruments whose auditory properties are very similar (tempo in part 1 instrument 1 loop 1 is 78—so the loop for part 2 instrument 1 is selected to have a tempo±2 (76 or 80) bpm). If the variance level is high this threshold area widens, e.g., it might widen with each step in the variance level±4.

According to another example, a variation in the loop selection process might be introduced by adding a random amount to each value that is used in the selection of a new loop. That is, in some embodiments a parameter that represents "calmness" might be provided for each loop. This parameter might represent, e.g., the amount of dynamic variation in that loop. Assume for purposes of discussion that the value of an initial existing loop is 0.60. If, for example, the randomization amount is set to 5%, when the AI system searches for loops to include in the skeleton, the search might be broadened to include loops with calmness values between 0.57 and 0.63 and, in some embodiments, values at the extremes might be preferentially selected, with the selection among multiple qualifying loops preferably being random in some embodiments.

In other embodiments, the user might be provided with a graphical user interface that shows, e.g., the ten most prominent parameters of either each loop or the whole generated song. This GUI could also provide a control that allows the user to prioritize each parameter, with the prioritization ranging from 100% to 0%, with 0% meaning that a parameter is never considered and 100% meaning the parameter is the most important, perhaps sole, parameter considered. By manipulating the individual controls for each parameter, the user will be able to instruct the AI system, e.g., to select more loops with a female singing voice (control to 100%) and completely ignore loops with aggressive mood (control to 0%). A setting of 50% for the parameter style could instruct the AI system to "mix" it up regarding the loop selection, i.e., the designated parameter is somewhat important, but the AI is permitted to stray from the base style determination set by the skeleton model.

Figure 4:
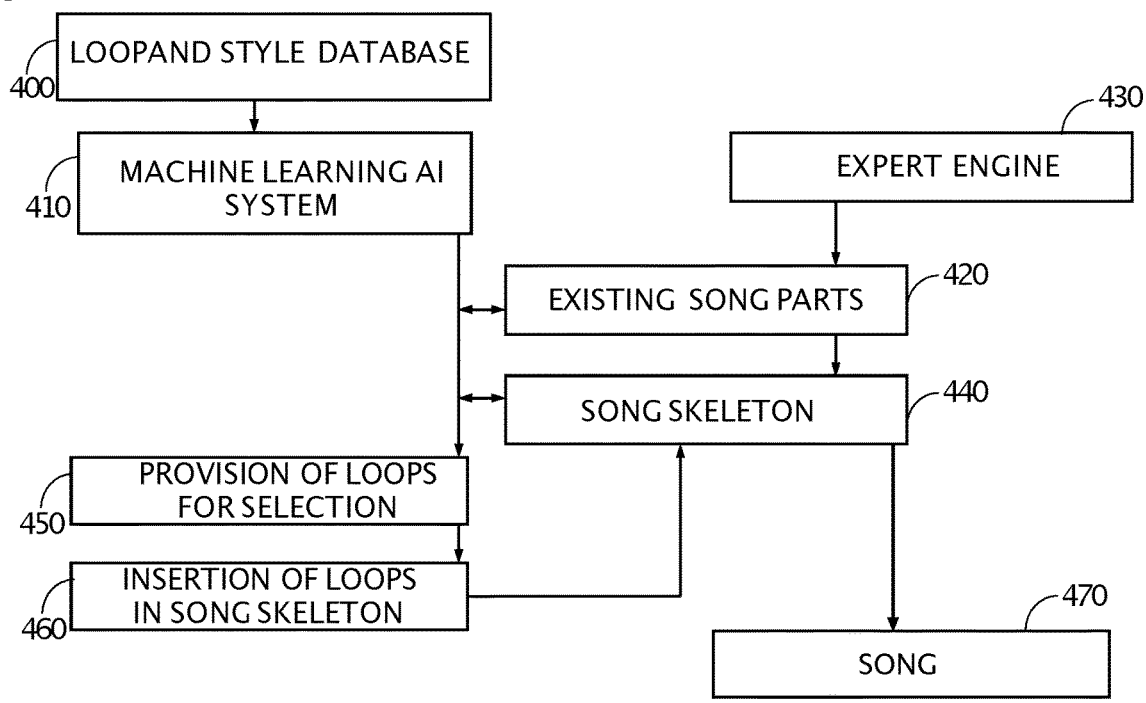
FIG. 4 depicts the functionality of the machine learning AI utilized in a variation of the instant invention.

Turning next to FIG. 4, this figure is depicting an embodiment that illustrates the functionality of the machine learning AI system 410. The system for machine-based learning is constantly being trained with the complete available database of styles and the therewith associated audio loops 400. Constantly meaning that, as has been disclosed, the loop and style availability changes over time, with new content being added to the database and content base or removed from it with the AI constantly evaluating these changes. The AI has complete knowledge of every audio loop, its auditory properties, length, tempo, dynamic and key. Additionally, the AI does know which audio loops are available locally for the user and which have to be purchased online.

Based on the song skeleton 440 generated by the expert engine 430 which utilizes any user provided existing song parts and their associated audio loops 420 and based on the information of the selected loops in the existing song parts 420 the AI selects suitable audio loops from the database for the expert engine generated song parts making up the song skeleton and automatically fills 460 the available data structures of the generated song skeleton 440 resulting in a completed song 470. In another embodiment the AI provides the determined audio loops for selection by the user 450, therewith providing more experienced users the ability to take on a more active part in the song generation process by manually deciding which audio loops to insert 460 into the song skeleton 440. The audio loop selection of the AI system is not bound by the initial style selection of the user, which results in a much bigger selection horizon compared to the manual selection of audio loops by the user. The utilization of the AI disrupts the predefined "only audio loops from the selected style" selection form music generation in an innovative, efficient and time saving manner.

The selection of suitable audio loops is realized utilizing all the known data from the available initial song parts. The existence of, in one embodiment, at least one song part that comprises of a length of 4 to 8 measures is sufficient for the functionality of the instant invention. Each of the potential song parts has instruments (for example drums, bass, guitar, synthesizer, vocals) selected and for each instrument at least one audio loop is inserted and selected. Each audio loop is stored in a database that additionally stores its individual auditory properties as well as its association to an instrument and style. The AI system initially determines the instruments from the existing song parts and determines compatible and usable instruments in a next step—this is realized by an ad hoc judgment regarding the usability of different new audio loops from individual instruments with respect to the already inserted and selected instruments and audio loops. This ad hoc judgment provides a determination above a specific threshold level which instrument and audio loop is acceptable in the specific song part of the generated song skeleton. In a next step the different and new audio loops are selected, provided to the user, and ultimately inserted into the generated song skeleton, this being carried out either automatically or depending upon user approval.

Figure 5:
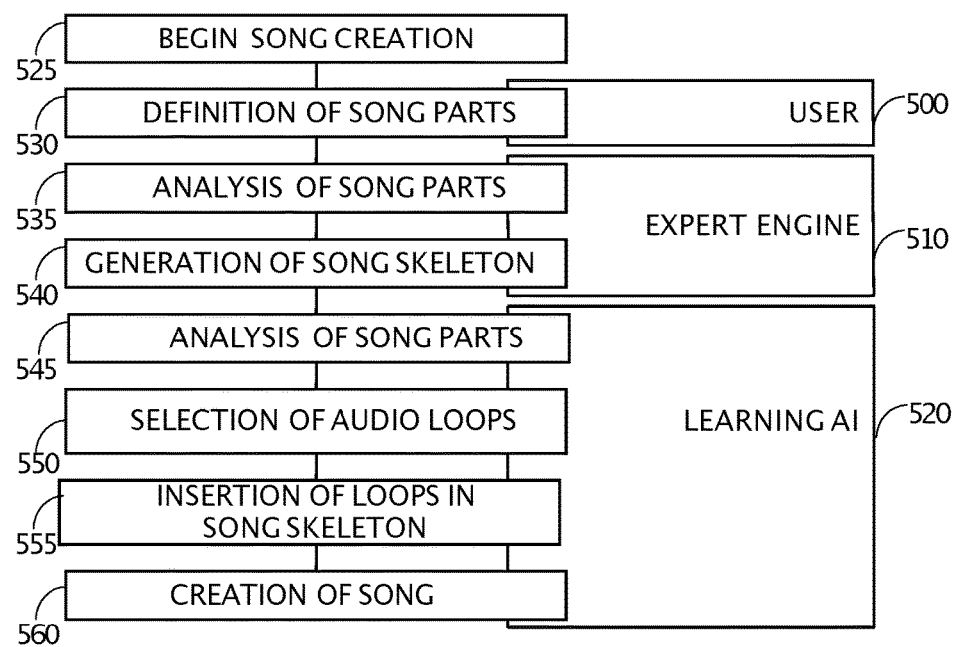
FIG. 5 is an illustration of a compressed form of the workflow of an embodiment the instant invention.

Coming next to FIG. 5, this figure is an illustration of one preferred workflow of the instant invention. As a first preferred step the user 500 initiates the song creation or generation process 525 from within a software program used for this purpose. In a next preferred step, the user 500 begins the manual creation of a song or music piece by defining individual song parts (at least one) 530 and providing these song parts with style selection, instrument selection and audio loop selection. In a next preferred step, either automatically or depending on activation by the user, the expert engine 510 begins the analysis of any already generated song parts 535 and as a result of that analysis generates a song skeleton 540, representing a full song consisting of a plurality of individual song parts.

Continuing in more detail, the song skeleton generation process is initiated by the expert engine by determining the user selected style or styles from any previously song parts or any of the information provided by the user. Depending on the determination of the style the expert engine makes the following sorts of choices—it should be understood that these choices do not need to be carried out sequentially, it might also be possible that the expert engine could be configured to process the mentioned points in a different order. In one embodiment, the expert engine determines a suitable length of the target song; this might depend, for example, on the initially selected style. For example, a 12-bar blues will typically have a verse that is 12 measures long, e.g., in the key of C the progression could be, by way of example only, C-C-C-C-F-F-C-C-G-F-C-C.

Next according to an embodiment, the expert engine determines the song scheme or song skeleton—for example, "Intro-Verse 1-Verse 1 Variation-Refrain 1-Verse 2-Verse 2 Variation-Refrain 2-Verse 3-Verse 3 Variation-Refrain 3-Ending". Then pluralities of different instruments are selected, where these instruments are selected to be compatible with the selected style. The expert engine also determines harmony sequences that are typical for the selected initial style—for example for a blues style a chord change pattern of C-C-F-F-C-G-F-C (in the key of C) would be a fitting harmony or chord sequence, where the letters represent chords in one variation of a traditional 8-bar blues.

Of course, there are a number of variations of, in this example, the 8-bar blues and the expert engine would be free to choose among them. One way to do this might be to choose a skeleton randomly from among those available. As another example, a familiar rock chord progression (in the key of G) might be G-D-E-C-G. Also, the dynamics structure for the song skeleton will be determined where, for example, the dynamics will be being defined as having a step wise increase from the beginning to the end of the song, e.g., the song would tend to get louder. The expert engine also could specify the level of the variation for each to be created song part, for example a definition of how many of the audio loops in each song part could be exchanged and how much the audio loops will be allowed to differ from the audio loops selected by the user.

The data that is utilized as the basis for the expert engine is gathered from a data foundation collected from experienced song producers, wherein in a preferred embodiment for each individual style a specific data set is created and stored in a database (preferably xml-based). The data will be constantly under review by these experts and will preferably be updated and varied at any time.

In a next preferred step, the machine-based learning AI 520 takes into account the data from the expert engine, the generated song skeleton 540 and any user created song parts 545 or any other information given by the user and begins with the selection of audio loops 550 and inserts these audio loops into the song skeleton 550 therewith creating the song 560.

After the song has been created utilizing the above listed steps and processes the user might have the desire to generate a plurality of different variants of the created song, wherein these variants are preferably generated with the resulting variants stemming exclusively from an approach utilizing provided harmony templates.

The variant generation is preferably started with a song that has been generated with either the disclosed mixture of the AI system and the expert knowledge or with a song that has been exclusively generated by the user—the common denominator being the fact that the initial song is acceptable to the user and being utilized for the variant generation process. A user might have the desire to generate variants of this particular song, because more (of the same) music is needed by the user to, for example, produce the music for a movie.

The instant embodiment discloses the use of harmony templates for the variant generation. These harmony templates are preferably generated by a human producer and supplied to the user as part of the song creation system or are provided to the user on a regular basis as soon as new harmony templates are generated. For each style that is selectable by the user there are a plurality of different harmony templates provided, for example for each quarter note of a song part. After the song has been constructed by the mixture of the AI system and the expert knowledge the user is able to implement the provided harmony templates corresponding to the style of the song and enhance the existing song and therewith generate the desired number of song variants. Each individual harmony template produces one song variant.

One example of the layout of a database entry associated with one embodiment of a harmony template is the following:

---
<part pitch="2, length_in_beats="16" name="Chorus">
   <harmony_template>
      AAAAAAAADDDDDDDD</harmony_template>

---

In this example, a loop affected by this harmony template has parameters that include its length, 16 beats, and its suggested use within a musical work, i.e., as part of the song chorus. It's starting pitch is "2" which means, in this specific example, that the loop is generally compatible with the key of "A", although it is contemplated that an ending pitch might also be provided in the event that the starting and ending pitch of the loop are associated with different keys.

The "harmony_template" provides a series of chords that would be compatible with the melody or general tone sequence of this loop. In the present example, one chord for each beat of the loop is provided. In this example, the harmony template contains 8 beats of the "A" chord followed by 8 beats of the "D" chord. Preferably, the "A" chord will be associated with the first 8 beats of the loop and the "D" chord with the last 8 beats. Note that the eight beats might be expressed musically as a single occurrence of the chord which is sustained for 8 beats or it could be two or more soundings of the chord, e.g., one sounding of the chord every $4^{th}$ beat of the loop, etc. Note that the sequence of chords might be modified automatically if, for instance, the loop were to be transposed to a different key.

Figure 6:
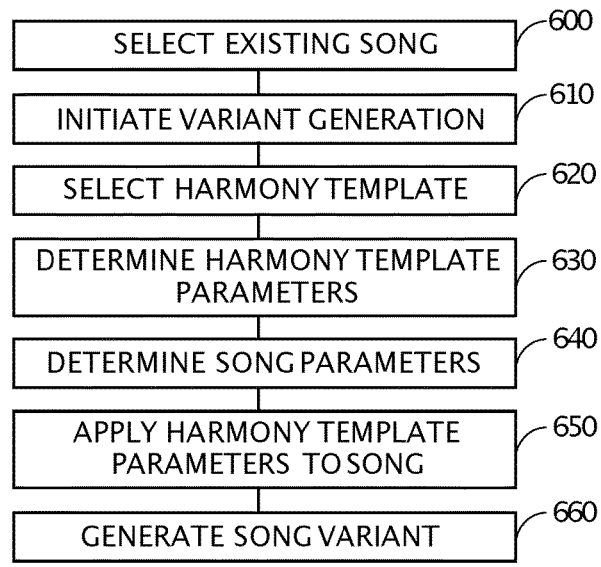
FIG. 6 illustrates a workflow of the instant invention of the variant generation process.

Now turning to FIG. 6, this figure illustrates one workflow of the variant generation process of the instant invention. In a first preferred step the user who wants to generate song variants chooses an existing, previously generated song or music work 600 for which the instant invention shall generate the song variant. In a next preferred step, the user initiates the song variant generation 610 by interacting with the graphical user interface of the software program. Generally, the user will be able to select a plurality of different song variant generation approaches, wherein in this particular embodiment the variant generation is implemented via the selection and application of harmony templates.

In a next preferred step, the instant invention will determine the style parameter associated with the chosen song/music work and selects each harmony template associated with the same style parameter setting from that database. The selected harmony templates are then provided to the user for further selection 620. To assist the user in the selection of a specific harmony template, each harmony template will preferably be provided with a plurality of associated audio loops that are compatible with the harmony template. That will make it possible for the user to preview each harmony template so that the quality and appropriateness of each harmony template can be reviewed before the user makes a final selection.

As a next preferred step, the instant invention will extract the harmony template parameters and associated settings from the selected harmony template 630. Examples of parameters that that might be associated with the loop include the chords, the length (in beats) and the defined chord sequence. The chords parameter is a global parameter for the complete harmony template defining the chords that are used within the harmony template, wherein the length (in beats) and the chord sequence parameter are specific for each individual song part configured in the harmony template. By, "global parameter" is meant that this parameter applies to all of the loops that are to be played in conjunction with the selected harmony template.

In a next preferred step, the instant invention will determine the parameters in the song that are compatible with the features of the harmony template. That is, the chords used in the song will be determined, as well as the individual song parts and the associated parameter values for these song parts, e.g., the length (in beats) and chord sequence.

In a next preferred step, the instant invention will apply the determined harmony template parameter values to the song 650 replacing the corresponding values stored within the song. It should be noted that both the harmony template as well as the completed song have the same structural layout and parameter, wherein when applying the harmony template parameter values the corresponding parameter values of the song will be adapted accordingly. That is, according to this embodiment, the existing chords of the song/music work will be set to the values in the harmony template, with the idea being that these values will represent global information regarding the chords' variability within the template as well as that of the song/music work. Also relevant for the variant generation is the application of the length (in beats) and chord sequence values from the harmony template to the music work which is implemented the same way as has been disclosed with the chord's parameter value.

The instant invention in some embodiments will go through the individual parameter values for each part of the harmony template and will apply the parameter values to the corresponding parts of the existing song/music work. That is, the length and the chord sequence of each corresponding part of the existing song/music work will be modified accordingly. With this modification, the instant invention will ultimately generate the song variant 660 according to the selected harmony template.

Figure 7:
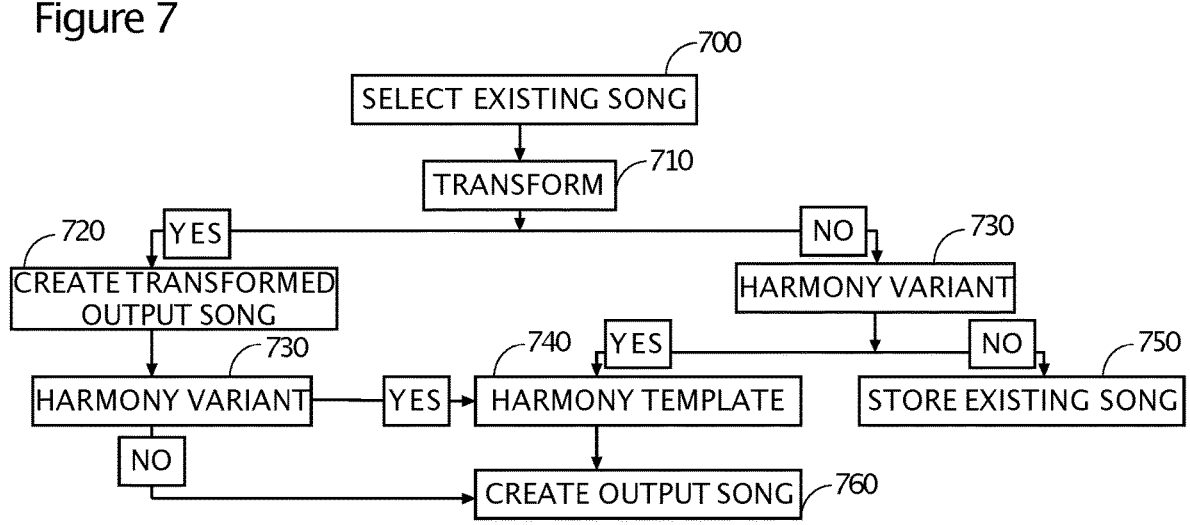
FIG. 7 depicts a flowchart of the harmony template based variant generation as part of the song generation process.

Turning next to FIG. 7, this figure illustrates a flowchart of the harmony template based variant generation as part of the song generation process. The starting point for this flowchart is the selection of an existing song/music work 700 by the user. Initially in this part of the song generation process the user is working with an already existing generated song/music work and is provided with the option to transform the existing song/music work 710. If the user decides to initiate a transform process of the existing song/music work a new transformed output song 720 will be generated from the existing song/music work, wherein in this embodiment the audio loops of the existing song/music work will be replaced with different audio loops selected according to a specific selection algorithm.

In case that the user decides not to select the transform process the user is provided with the option of selecting a harmony variant 730. If the user rejects the option for the generation of a harmony variant the instant invention stores the existing song/music work 750. If the user decides to accept the generation of a harmony variant the user is provided with a selection option of all available harmony templates 740 for the style of the existing song/music work. In a next preferred step, the user selects one of the available and provided harmony templates to generate a new output song 760 after application of the harmony template.

In the particular example of this FIG. 7, the user is also given the option of initiating the harmony variant 730 generation to produce a transformed output song 720. If the user does not accept the option, the process will store the transformed output song/music work as the output song/music work 760. If the user decides to initiate the generation of a new variation using the harmony template 730, preferably after determining the quality of the transformed output song/music work, the process will provide the available harmony templates 740 for the style of the song to the user for selection. In a next preferred step, the user selects one of the available and provided harmony templates to generate a new output song 760 after application of the harmony template.

Figure 8:
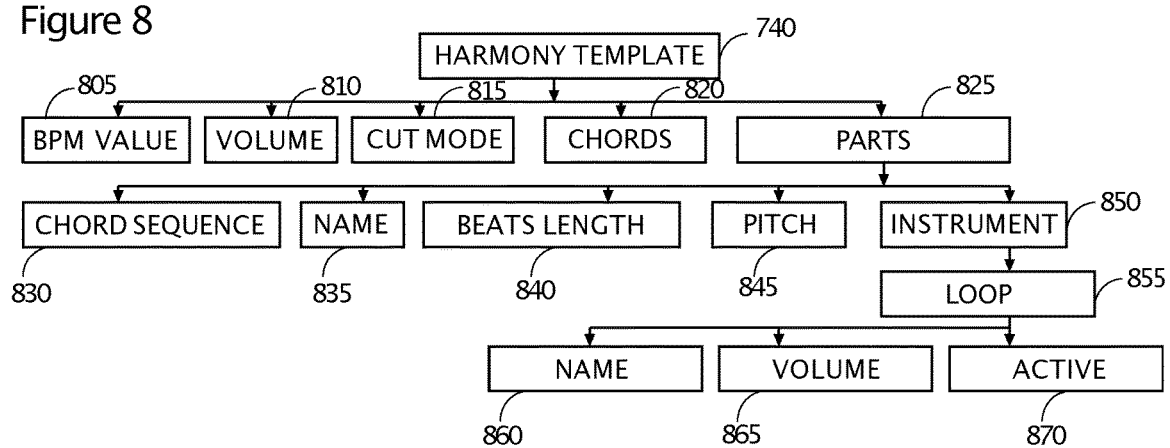
FIG. 8 is an illustration depicting the structural setup of the harmony templates.

Coming next to FIG. 8, this figure is an illustration depicting the structural setup of the harmony templates of this embodiment of the instant invention. The specific structure of the harmony template 740 contains a plurality of different parameters and associated values and different levels wherein only a limited number of these parameter are relevant for a preferred embodiment of the instant invention—the other parameters are preferably provided for providing a preview functionality to the user.

On the first level, each harmony template will typically contain the following parameters and associated parameter values, the bpm value 805, volume 810, cut mode 815, chords 820 and parts 825. The bpm value 805 represents the assigned beats per minutes value of the template, the volume parameter 810 represents the volume of the template, the cut mode 815 defines the specific mode or criteria according to which the audio loops in the harmony template are cut. The chords 820 represents a listing of the available chords that are a part of the template and that are after selection of a specific harmony template applied to the existing song/music work.

Additionally, the database harmony template structure contains certain preferred fields 825, which contain parameters related to the template. The parameters include the chord sequence 830, the name 835, the length of the template in beats 840, the pitch 845 and the instrument 850. Each instrument 850 is associated with an audio loop 855, with each loop featuring an associated name 860, a volume value 865 and an active 870 setting.

The harmony template could be viewed as a short song/music work, wherein, as has been disclosed, most of the content of a harmony template, is directed to provide the user a preview functionality prior to selection and application of the template to the existing song/music work. Particularly relevant for the application of the template in most cases are the chords 820 parameter, the parts 825 and the beats length 840 parameter of each part and the chord sequence 830 for each part. The other parameters, e.g., the bpm value 805, volume 810, cut mode 815, name 835 of the part, pitch 845 of the part, instrument 850 and loop 855 parameter including the name 860, volume 865 and active 870 are all directed to providing the user the preview functionality. In some cases, the parameters will not be knowable or alterable by the user.

The bpm value 805 represents the value according to well-known bpm value determination algorithms, the volume value 810 can take a plurality of different ranges, however in a preferred embodiment it ranges from the values of 0 (very low) to 100 (very high). The cut mode 815 defines the specific mode or criteria according to which the audio loops in the harmony template are cut, wherein possible options are according beat and/or bar. The pitch parameter of the parts 845 represents the pitch level of each specific part and is preferably ranged according to an internal listing numerically from 0 to 10 for example. The instrument 850 parameter and the associated loop parameter 855 represent the specific sections (instrument) and the content (loop) parameter of the harmony template. Each audio loop 855 of each instrument 850 of each part 825 has an associated name 860, volume 865 and an active parameter 870, wherein the active parameter features an on/off setting, which determines if that loop is active or not.

Figure 9:
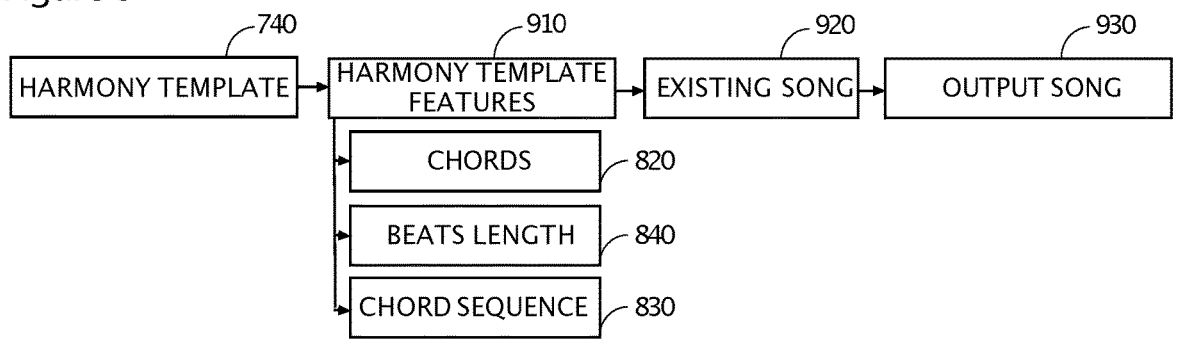
FIG. 9 depicts a flowchart of the application of the harmony template to the initial song.

Coming next to FIG. 9, this figure depicts a flowchart of the application process of the harmony template to the initial song/music work. The harmony template 740 is selected by the user for application and the instant invention selects the necessary harmony template features 910, respectively the chords parameter 820, the beats length parameter 840 and the chord sequence parameter 830 and applies the values of the features to the existing song/music work 920 to therewith after application generate the output song/music work 930.

The existing selected song/music work has, as has been disclosed, the same or a similar structure as the harmony template which allows the instant invention to apply the data values of the named harmony template features to the corresponding features of the existing song/music work. In a preferred embodiment, the instant invention adapts the chords parameter value of the existing song to the parameter value of the harmony template. The beats length and the chord sequence parameter are, as has been disclosed, parameters and associated values that are connected to each part that makes up the template. The instant invention parses through each part of the harmony template sequentially, selects the associated values for beats length 840 and chord sequence 830 and applies these values to the same parts of the existing song 920 resulting in the output song/music work 930, wherein applying these values comprises of selecting audio loops from the audio loop database that are featuring the required chords for the chord sequence 830. It should be noted that each audio loop in the database is stored in at least eight chord variants.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an addition" element, that does not preclude there being more than one of the additional elements.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiment, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as is fully set out at this point.

CONCLUSIONS

Of course, many modifications and extensions could be made to the instant invention by those of ordinary skill in the art. For example, in one preferred embodiment an experienced user might be provided with an elaborate graphical user interface allowing the user to define specific parameter regarding the song creation. So, for example a graphical user interface might be provided that allows the user to define the length of the desired song, a specific value determining the variance of the song—meaning defining how diversified the song should be and how much the song is allowed to differ from the original ideas of the user.

Additionally, it might be possible for the user to control the style selection—defining which styles are usable by the AI and which are off limits—with a strict limitation option as well as a variable option, wherein the strict limitation defines desired and non-desired styles and the variable limitation is depending on the variance setting. Furthermore, the user might be allowed to influence the harmony setting, defining which keys the song should be using. Also, a determination of the dynamic scheme might be possible, allowing the user to define a dynamic curve for the song.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of music work variant generation, comprising the steps of:

in a digital computer programmed to perform program steps comprising:
a. accessing a digital music work, said digital music work having a plurality of song parameters associated therewith;
b. providing a digital database containing a plurality of digital harmony templates;
c. receiving from a user a selection of a digital harmony template from among said plurality of available digital harmony templates in said database, said selected digital harmony template having a plurality of digital harmony template parameters associated therewith;
d. identifying an associated digital harmony template parameter value associated with each of said plurality of digital harmony template parameters;
e. identifying a plurality of song parameters from said digital music work corresponding to a same plurality of digital harmony template parameters, each of said identified plurality of song parameters from said digital music work having an associated identified song parameter value associated therewith;
f. replacing said identified plurality of song parameter values of said music work with said corresponding plurality of digital harmony template parameter values, thereby generating a digital music work variant; and
g. performing at least a portion of said generated digital music work variant for the user.

2. The method according to claim 1, wherein said digital music work has a style parameter associated therewith and wherein said digital harmony template is selected from among a plurality of digital harmony templates corresponding to said style parameter.

3. The method according to claim 1, wherein said digital harmony template parameters comprise at least a style parameter, a chord selection parameter, a chord sequence parameter, a bpm parameter, a volume parameter, a cut mode parameter, a pitch parameter, an instrument parameter and a length parameter of said digital harmony template in beats.

4. A method of hybrid AI/expert engine-based song generation, comprising the steps of:
a. requiring a user to select a music style from among a plurality of music styles in a music style database
b. providing the user with to at least one song part corresponding to said selected music style;
c. requiring the user to select at least one of said at least one song parts corresponding to said selected music style;
d. using an expert engine to automatically analyze said selected at least one song part to produce a song skeleton structure based on said selected music style and said at least one song part;
e. using an AI-based system to select a plurality of audio loops from an audio loop database for insertion into said song skeleton structure, each of said audio loops in said audio loop database having a plurality of performance parameters associated therewith, said AI system selecting said plurality of audio loops for insertion using at least said plurality of performance parameters associated with each audio loop in said database;
f. inserting said selected plurality of audio loops into said generated song skeleton structure, thereby generating a digital music work, said digital music work having a plurality of music work parameters associated therewith;
g. providing a database containing a plurality of digital harmony templates;
h. requiring a user to select a digital harmony template from among said plurality of available digital harmony templates in said database, said selected digital harmony template having a plurality of harmony template parameters associated therewith;
i. identifying the digital harmony template parameter values associated with each of said selected plurality of digital harmony template parameters;
j. identifying a plurality of music work parameters from said generated music work corresponding to said plurality of digital harmony template parameters, each of said identified plurality of music work parameters from said generated music work having an identified music work parameter value associated therewith;
k. replacing said identified plurality of music work parameter values of said music work with said corresponding plurality of harmony template parameter values, thereby generating a digital music work variant; and
l. performing at least a portion of said digital music work variant for the user.

5. The method according to claim 4, wherein said digital music work has a style parameter associated therewith and wherein said digital harmony template is selected from among a plurality of available digital harmony templates corresponding to said style parameter.

6. The method according to claim 5, wherein said digital harmony template parameters comprise at least a style parameter, a chord selection parameter, a chord sequence parameter, a bpm parameter, a volume parameter, a cut mode parameter, a pitch parameter, an instrument parameter, and a length parameter of said digital harmony template in beats.

7. A method according to claim 4, wherein the step of replacing the parameter values of the determined corresponding digital music work parameters with the digital harmony template parameter values comprises selecting digital audio loops from a digital audio loop database that correspond to the chord sequence parameter and chord selection parameter, thereby replacing each digital audio loop in said selected digital music work.

* * * * *